Dec. 13, 1938.   W. D. HODSON   2,140,426
LUBRICATING WIRE ROPE
Filed Oct. 9, 1936
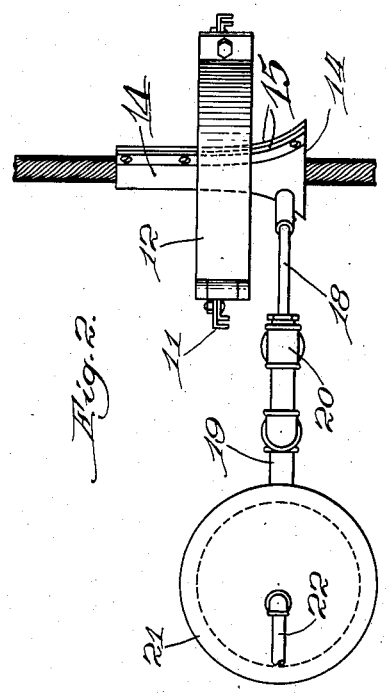
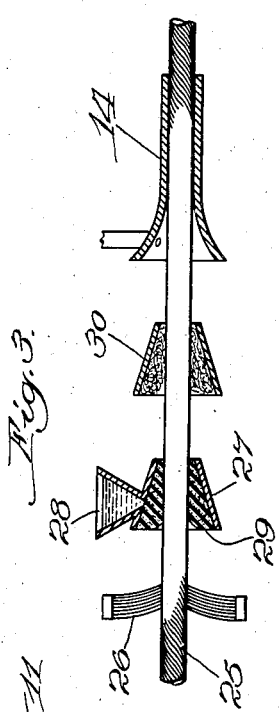
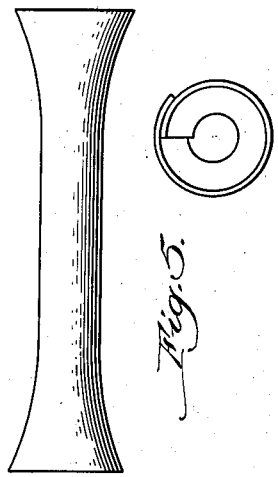
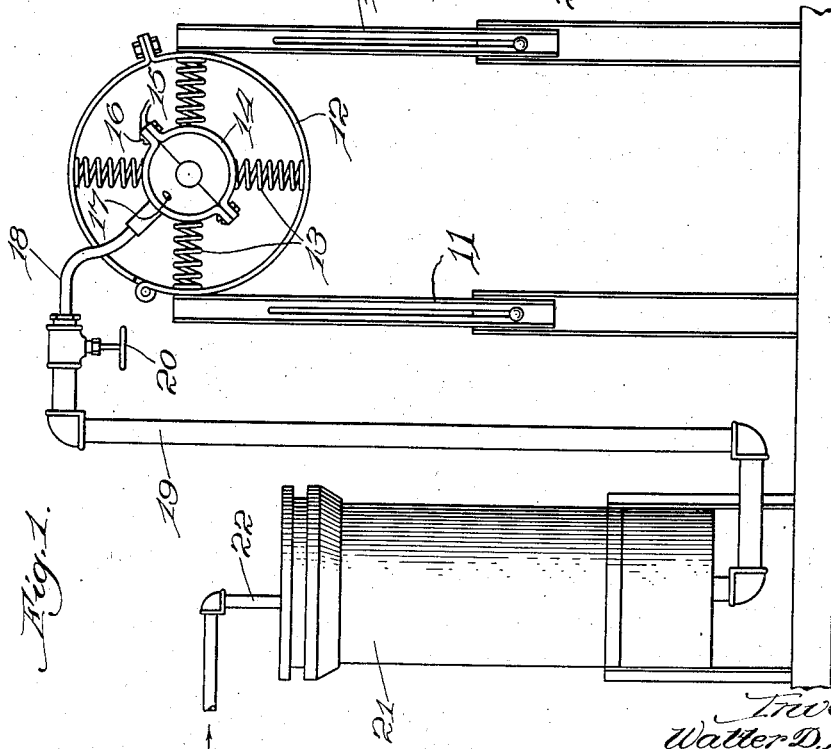
Inventor:
Walter D. Hodson,
By Dyrenforth, Lee, Chritton & Wiles
Attys.

Patented Dec. 13, 1938

2,140,426

UNITED STATES PATENT OFFICE 2,140,426

LUBRICATING WIRE ROPE

Walter D. Hodson, Beverly Hills, Ill.

Application October 9, 1936, Serial No. 104,881

3 Claims. (Cl. 184—15)

This invention relates to a method of lubricating wire ropes in the field and apparatus therefor.

In my Patent No. 2,028,158, issued January 21, 1936, is described a method for applying viscous tenacious lubricant to fibers of rope or wire rope in which the individual fibers, while being drawn together, are passed through a bath of material maintained under pressure by means of the drawing together of the strands and the natural adhesion of the material thereto. It has now been discovered that a completed wire rope may be lubricated in service in the field in a similar manner, the bath of lubricant being maintained, however, solely by means of adhesion to the wire rope itself.

In accordance with this invention, a wire rope, such as a cable or the like, is passed through a distributing and spreading funnel within which a viscous tenacious lubricant is supplied, and the movement of the rope is made sufficiently rapid so that the adhesion of the lubricant thereto will maintain within the funnel a mass of lubricant through which the rope passes and in which it acquires a uniform coating of the lubricant.

The invention is illustrated in the drawing, in which—

Fig. 1 is an elevation of the lubricating device; Fig. 2 is a plan view thereof; Fig. 3 is a diagrammatic view of a system embodying a prior cleaning of the rope; Fig. 4 is an elevational view of a modified funnel; and Fig. 5 is a front view of the funnel shown in Fig. 4.

The lubricant employed is preferably of the type described in my Patents 2,028,157, issued January 21, 1936, No. 2,000,952, issued May 14, 1935 and 2,028,156, issued January 21, 1936. Such a lubricant is normally extremely adhesive and extremely viscous and will not readily seek its own level by gravity.

The lubricating device is mounted upon a platform 10 and comprises adjustable supports 11 between which is mounted the ring 12 carrying a plurality of heavy coil springs 13, to which is attached a split funnel 14. The funnel is preferably of cast iron, cast in two halves, each provided with flanges 15 along the sides and held together by removable fastenings, such as bolts 16. Near the mouth of the funnel an opening 17 is provided attached by a flexible connection 18 to the grease line 19. A grease control valve 20 is provided in this line. Grease is forced from pressure tank 21 by compressed air supplied through the line 22.

The rear portion of the funnel is preferably adapted to be supplied with bushings not shown, either for the purpose of accommodating the funnel to different sized ropes, or for the purpose of supplying different thicknesses of lubricant coating thereon. These bushings are preferably of hardened metal.

In the operation of the device, the viscous tenacious lubricant is fed in through the opening 17 and upon contacting the wire rope is drawn by the movement of the rope into the more restricted portions of the funnel, wherein it builds up a bath of material under pressure and thereby forces itself into intimate contact on all parts of the wire rope. As used in the field, wire ropes customarily are under very considerable tension, and in passing through the funnel will force the funnel to align itself with the rope. The springs 13 provide a universal mounting for the funnel which permits automatic adjustment thereof into alignment with the rope. The speed of passage of the rope should be sufficiently great to maintain the bath of lubricant within the funnel. Normal moving speeds for wire rope will accomplish this result with the type of lubricant here described.

In Fig. 3 is illustrated diagrammatically a complete rehabilitation system for wire ropes which have been used, in which a rope 25 is passed through a brush or series of brushes 26 which are preferably of copper or brass and may be motor driven. It is preferred to set these brushes, if motor driven, at an angle to correspond to the spiral of the rope. After being brushed, the rope passes through the funnel 27, in which cleaning solution is supplied from a reservoir 28, to applicators 29, which may be cloth or other absorbing material or sponge rubber. Any suitable cleaning solution may be used, such as a light solvent oil, or kerosene. The rope then passes through the wiper 30 and into the lubricating system here designated 31. If desired, the cleaning solution may be applied through the same funnel used for lubricating, in which case the rope is run through twice.

In Fig. 4 a modified form of funnel is shown which is particularly applicable for smaller ropes. This funnel comprises a double mouth funnel, made of spring metal and having overlapping walls held by the tension of the metal in tight contact. The funnel, however, may be supplied by hand or tool to place on or remove from a rope.

The foregoing detailed description has been given for clearness of understanding only, and no unnecessary limitations should be understood

I claim:

1. A funnel for lubrication of wire ropes comprising an integral sheet of spring metal bent to funnel shape and having its longitudinal edges in overlapping position, said sheet being yieldingly held in bell mouthed funnel shape by its springiness and being adapted to yield to permit entry of a rope between the longitudinal edges thereof and to spring back to its original position upon release of the pressure the narrower portion of the funnel being adapted to clasp tightly a rope passing therethrough.

2. An apparatus for the lubrication of wire ropes comprising a split frame, a split bell mouthed funnel, the narrower portion of the funnel being shaped to clasp tightly a rope passing therethrough, and the funnel being universally mounted with the frame to permit alignment thereof with a rope passing therethrough, and means for applying a viscous, tenacious lubricant in the mouth of the funnel, the longitudinal axis of the funnel being transverse to the plane of the frame.

3. An apparatus as set forth in claim 2 in which the universal mounting comprises a plurality of springs under tension.

WALTER D. HODSON.